US008190089B2

(12) United States Patent
Heo

(10) Patent No.: US 8,190,089 B2
(45) Date of Patent: May 29, 2012

(54) BLUETOOTH UNIT OF MOUNTING TYPE

(75) Inventor: Ju Won Heo, Gumi (KR)

(73) Assignee: GT Telecom Co., Ltd., Gumi-shi, Kyungsangbuk-do (KR)

( * ) Notice: Subject to any disclaimer, the term of this patent is extended or adjusted under 35 U.S.C. 154(b) by 85 days.

(21) Appl. No.: 12/878,701

(22) Filed: Sep. 9, 2010

(65) Prior Publication Data

US 2011/0250843 A1 Oct. 13, 2011

(30) Foreign Application Priority Data

Apr. 12, 2010 (KR) ........................ 10-2010-0033452

(51) Int. Cl.
*H04B 7/00* (2006.01)
(52) U.S. Cl. .. 455/41.2; 455/99; 455/569.2; 340/426.24
(58) Field of Classification Search ................. 455/41.2, 455/99, 569.2, 575.1, 90.3, 426.1, 462; 340/426.24, 340/539.26; 370/338, 352
See application file for complete search history.

(56) References Cited

U.S. PATENT DOCUMENTS

| | | | | |
|---|---|---|---|---|
| 6,737,962 B2 * | 5/2004 | Mayor | ........................... | 340/431 |
| 6,844,829 B2 * | 1/2005 | Mayor | ............................. | 341/27 |
| 6,962,228 B2 * | 11/2005 | Ogino et al. | ................... | 180/274 |
| 6,985,089 B2 * | 1/2006 | Liu et al. | ........................ | 340/903 |
| 7,116,975 B1 * | 10/2006 | Link et al. | ...................... | 455/417 |
| 7,142,814 B2 * | 11/2006 | Nassimi | ........................ | 455/41.2 |
| 7,577,455 B2 * | 8/2009 | Szymanski et al. | ............ | 455/519 |
| 7,725,279 B2 * | 5/2010 | Luinge et al. | .................... | 702/94 |
| 7,778,262 B2 * | 8/2010 | Beagley et al. | ................ | 370/401 |
| 7,912,020 B2 * | 3/2011 | Khasawneh et al. | ........... | 370/338 |
| 7,973,657 B2 * | 7/2011 | Ayed | .......................... | 340/539.23 |
| 2006/0270361 A1 * | 11/2006 | Szymanski et al. | ........... | 455/90.2 |
| 2006/0270429 A1 * | 11/2006 | Szymanski et al. | ............ | 455/518 |
| 2008/0122609 A1 * | 5/2008 | Mannisto et al. | .............. | 340/500 |
| 2009/0207013 A1 * | 8/2009 | Ayed | ........................... | 340/539.1 |
| 2009/0207014 A1 * | 8/2009 | Ayed | ........................... | 340/539.13 |
| 2009/0249202 A1 * | 10/2009 | Bonnat | ......................... | 715/700 |
| 2010/0019920 A1 * | 1/2010 | Ketari | ......................... | 340/686.6 |
| 2010/0022217 A1 * | 1/2010 | Ketari | ............................ | 455/411 |
| 2010/0056055 A1 * | 3/2010 | Ketari | .......................... | 455/41.3 |
| 2010/0329491 A1 * | 12/2010 | Johansen | ....................... | 381/315 |
| 2011/0004327 A1 * | 1/2011 | Bonnat | ........................... | 700/83 |
| 2011/0021140 A1 * | 1/2011 | Binier | .......................... | 455/41.1 |
| 2011/0084807 A1 * | 4/2011 | Logan et al. | .................. | 340/10.1 |
| 2011/0131597 A1 * | 6/2011 | Cera et al. | ......................... | 725/24 |
| 2011/0169654 A1 * | 7/2011 | Ketari | ............................ | 340/687 |
| 2011/0281687 A1 * | 11/2011 | Gilley et al. | ....................... | 482/8 |

* cited by examiner

*Primary Examiner* — Minh D Dao
(74) *Attorney, Agent, or Firm* — Lowe Hauptman Ham & Berner LLP

(57) ABSTRACT

A mounting type Bluetooth unit is provided, which can lengthen the life span of a battery. The mounting type Bluetooth unit is fixedly installed in the interior of a vehicle and is provided with a casing body that packages a circuit board having a controller with control logic for performing Bluetooth communication with a Bluetooth device of a portable phone. The controller further includes a human body sensor as a control switch of operation logic. Also, the controller further includes a logic for sensing a driver's getting into/out of the vehicle in accordance with existence/nonexistence of a sensing signal of the human body sensor and controlling the operation of the Bluetooth unit in a sleep/awake or power-on/off state to cancel pairing with the Bluetooth device in a non-use state.

5 Claims, 5 Drawing Sheets

BLUETOOTH UNIT OF MOUNTING TYPE

BACKGROUND OF THE INVENTION

1. Field of the Invention

The present invention relates to a mounting type Bluetooth unit, and more particularly to an improved configuration of a Bluetooth device that communicates with a mobile communication device with various kinds of voice or audio bases, such as a portable terminal that is represented by a portable phone, a PDA, or the like, an audio appliance such as MP3 or the like, or a voice or audio device based on Bluetooth communication.

2. Description of the Prior Art

As generally known in the art, a device, which is in cooperation with a mobile communication device represented by a portable phone and which is based on Bluetooth communication, has recently been manufactured and widely used in diverse forms due to the simplicity and call reliability of wireless systems.

In particular, since a Bluetooth communication system can replace a wireless or FM transmitting type hands-free function in the related art, most recent portable phones basically install communication functions according to the Bluetooth rules, and various types of Bluetooth devices pairing with portable phones or audio devices such as MP3 have been developed with their use further extended.

As a representative example of a Bluetooth unit that is a typical Bluetooth device, a headset Bluetooth-pairing with a mobile communication device such as a portable phone is general, and the headset is a portable transmission/reception unit in the form of an earphone or a headphone.

However, with the spread of Bluetooth device at low cost and with the widespread use of vehicles, a Bluetooth unit has been highlighted as a Bluetooth device for use in a vehicle.

A conventional headset type Bluetooth unit is not preferable to be used in a vehicle due to the feeling of awkwardness and the physical burden caused by long-time wearing. As a unit having an independent casing mounted with a speaker rather than a headset or an earphone, a mounting type Bluetooth unit that is fixedly mounted in the interior of the vehicle has been widely used.

In particular, a mounting type Bluetooth unit, which is fixedly put on a sun visor or a mirror visor installed on an upper part above a head portion of a driver or which is mounted on a window glass in front of a driver by an auxiliary mechanical means such as a mounting arm or the like, is mounted on a position in which driver's voice can mostly be received, and thus can be conveniently used on a long-distance journey and so on. This mounting type Bluetooth unit has been widely spread due to its convenience in a country, such as America, in which a traveling distance is relatively long.

For example, in America, a user may use a mounting type Bluetooth unit Bluetooth-pairing with a portable phone in a vehicle during driving the vehicle, and when the user gets out of the vehicle and moves or works, the user can make a call or listen to music using the portable phone itself or a headset or an earphone Bluetooth-pairing with the portable phone.

In most American houses, garages and interior spaces are adjacently arranged with some partitions. When the driver returns home and parks his/her vehicle, the driver may get out of the vehicle without turning off the mounting type Bluetooth unit that is driven by a rechargable battery or may come into the interior space without canceling the Bluetooth connection (connecting state). In this case, the mounting type Bluetooth unit may still be in a Bluetooth connection state with the user's portable phone in the interior space since the typical Bluetooth device has a reaching distance of 10 m or more.

In this case, even if the user intends to receive the call through the portable phone, the user cannot receive the call since the portable phone is still in a Bluetooth connection state with the Bluetooth unit in the vehicle.

Further, since the standby state due to the Bluetooth connection state is continuously kept with continuous power consumption of the battery, the problem that the battery is rapidly discharged occurs.

This problem may frequently occur since most users are liable to forget or to think it too much trouble to turn off the Bluetooth unit mounted on the sun visor.

In order to solve this problem, a power line may be drawn from the Bluetooth unit mounted on the sun visor to a cigar-jack to continuously charge the battery during driving. However, this configuration is difficult to be adopted since its installation is complicated, and this may also cause a rapid discharge of the battery when the vehicle is in an engine-off state.

Recently, with the improvement of the performance of the battery, long-time use of the battery becomes possible through a single charging of the battery. However, even in the Bluetooth connection state, the rapid discharging of the battery is unavoidable, and considering that it is difficult to separate and charge the mounted Bluetooth unit, the above-described problem may cause a big stumbling block in spreading the mounting type Bluetooth unit for use in a vehicle.

Conventional Bluetooth units, and particularly, headset type Bluetooth units have diverse means for solving the rapid battery discharging problem.

For example, in a prior patent application filed by the inventor of the present invention, a mechanical construction in which the power is turned on by an operation button in a specified position using a hall switch has been proposed. However, this construction is suitable to a headset type Bluetooth device, but it is difficult to use this construction in the Bluetooth unit mounted in the interior of the vehicle, and user's intentional switch manipulation is still required in this construction.

Since a portable Bluetooth unit such as a headset is carried by a user, the discharge of the power can be easily prevented by operating a specified tool. However, in the case of the Bluetooth unit mounted in the interior of the vehicle, most drivers may forget this, and thus the mounting type Bluetooth unit cannot become a fool-proof configuration which requires minimum operation from the user.

SUMMARY OF THE INVENTION

Accordingly, the present invention has been made to solve the above-mentioned problems occurring in the prior art, and an object of the present invention is to provide a mounting type Bluetooth unit which can lengthen the life span of a battery.

In order to accomplish this object, there is provided a mounting type Bluetooth unit, according to an embodiment of the present invention, which is fixedly installed in the interior of a vehicle and which has a casing body that packages a circuit board having a controller with control logic for performing Bluetooth communication with a Bluetooth device of a portable phone; wherein the controller further includes a human body sensor as a control switch of operation logic; and the controller further includes logic for sensing a driver's getting into/out of the vehicle in accordance with existence/ nonexistence of a sensing signal of the human body sensor and controlling the operation of the Bluetooth unit in a sleep/awake or power-on/out of state to cancel connection with the Bluetooth device in a non-use state.

The control logic of the controller may execute the steps of the human body sensor that is in a continuous sensing state sensing the interior of the vehicle; if the driver gets out of the vehicle and the human body sensor of the Bluetooth unit senses no body temperature and non-movement of the driver to provide no output signal, the Bluetooth unit being in a sleep state in which its operation is inactivated or in a power-off state; if the driver gets into the vehicle and the human body sensor senses this and provides an output signal to the controller, the controller awaking the Bluetooth unit to start its operation or triggering the power-on of the Bluetooth unit; the controller of the Bluetooth unit attempting connection with a surrounding Bluetooth device of a portable phone and keeping a use state of the connected Bluetooth device; if the driver gets out of the vehicle and the human body sensor provides no output signal due to the absence of the driver in the vehicle, canceling the connection with the Bluetooth device of the portable phone and shifting to the sleep state or the power-off state; and if the human body sensor senses the driver's getting into the vehicle, continuously keeping the Bluetooth connection state.

The human body sensor may include dual compensated sensing elements sensing the body temperature and the movement of the human body, and particularly, the human body sensor may be a PIR (Pyroelectric Infrared Radial) sensor.

With the above-described configuration, the mounting type Bluetooth unit according to an embodiment of the present invention provides the means for sensing the driver's getting into/out of the vehicle and its control logic, and when the driver gets out of the vehicle, the Bluetooth unit is in a power-off state or in a sleep state to prevent the power consumption in the connection state, and thus the life span of the battery can be greatly lengthened.

Further, when the driver gets out of the vehicle, the operation of the Bluetooth unit is stopped to remove the crosstalk and interference caused by the plurality of Bluetooth devices, and thus the call mistake can be prevented.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
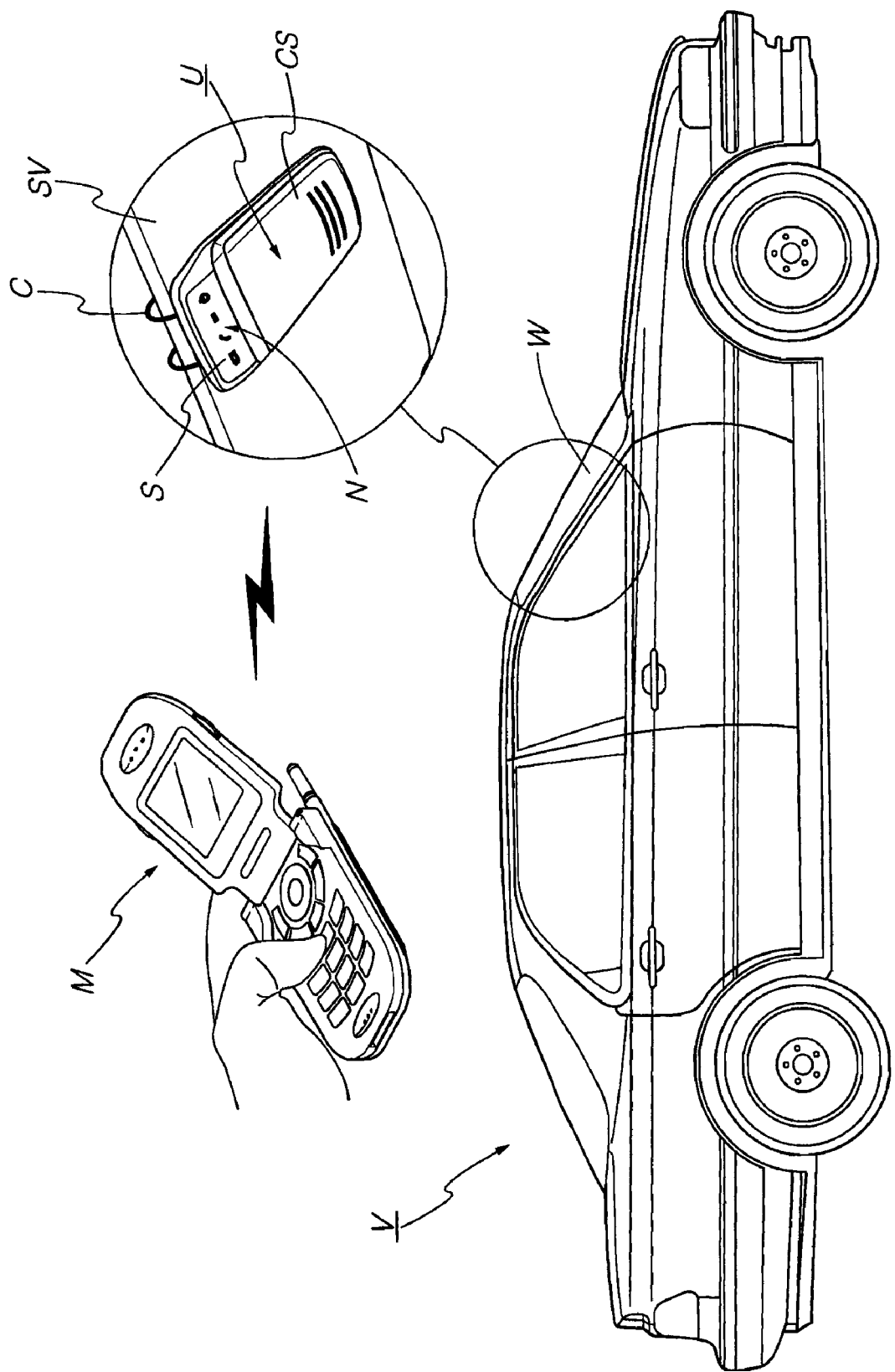
FIG. 1 is a view illustrating a use example of a mounting type Bluetooth unit to which the present invention is applied.

Hereinafter, an exemplary embodiment of the present invention will be described with reference to the accompanying drawings. In the following description and drawings, the same reference numerals are used to designate the same or similar components, and so repetition of the description on the same or similar components will be omitted.

A mounting type Bluetooth unit according to an embodiment of the present invention aims at lengthening of the life span of a battery in consideration of the problems of the Bluetooth type transmission/reception unit in the related art.

Also, if indoor spaces are adjacently arranged with some partitions in a single house, a typical Bluetooth appliance, which has a reaching distance of 10 m or more, is continuously connected to a Bluetooth device. Accordingly, a call of a portable phone is automatically connected to the Bluetooth device according to the kind of the portable phone or the set function thereof, and thus the problem that the call actually becomes impossible can be solved.

Hereinafter, an exemplary embodiment of the present invention will be described in more detail with reference to the accompanying drawings. Since the operation and the circuit configuration of a typical Bluetooth unit are generally known, the detailed explanation thereof will be omitted, and the configuration for implementing the present invention will be described.

Figure 2:
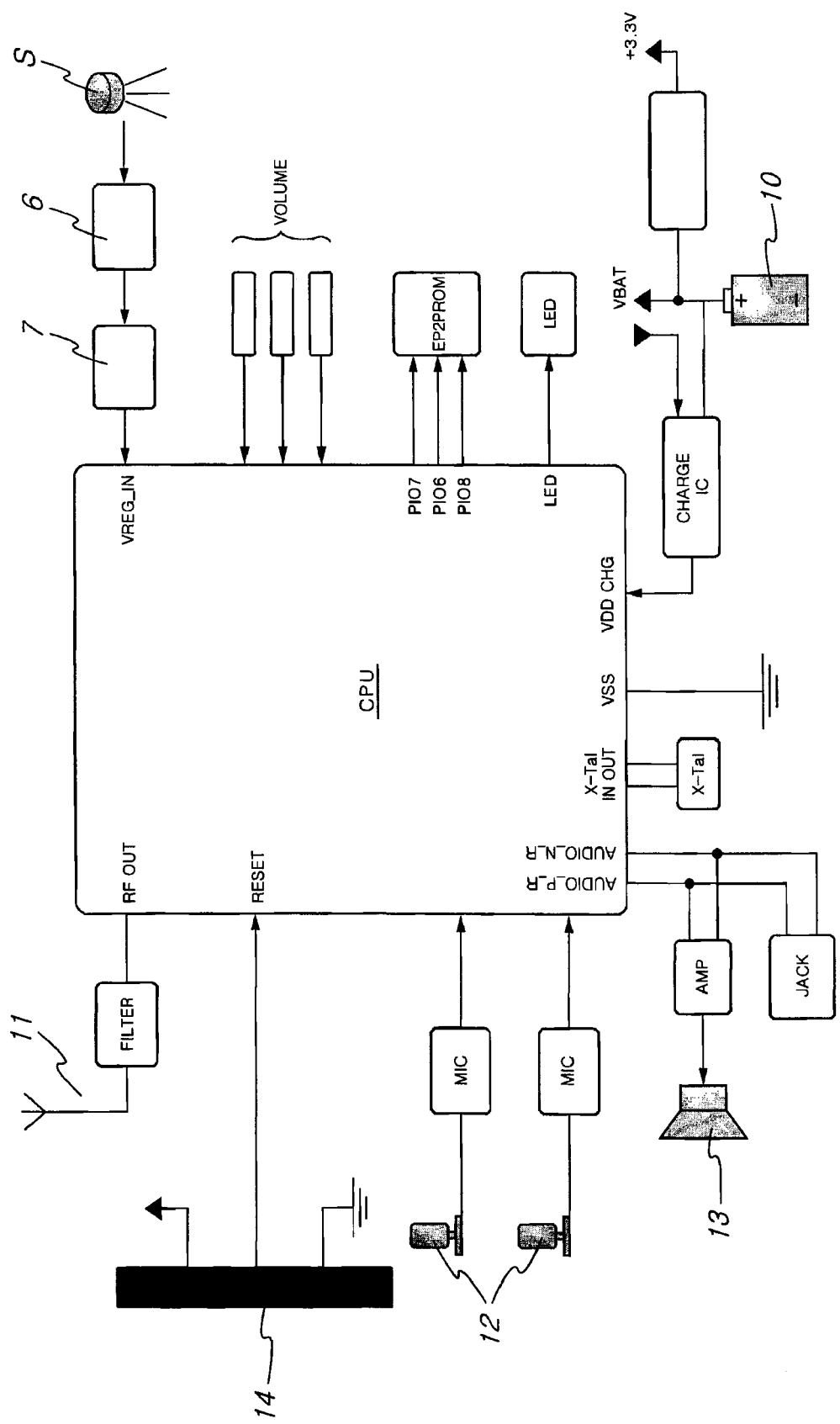
FIG. 2 is a circuit diagram illustrating the configuration of a sensor operation unit of a mounting type Bluetooth unit according to an embodiment of the present invention.
Figure 3:
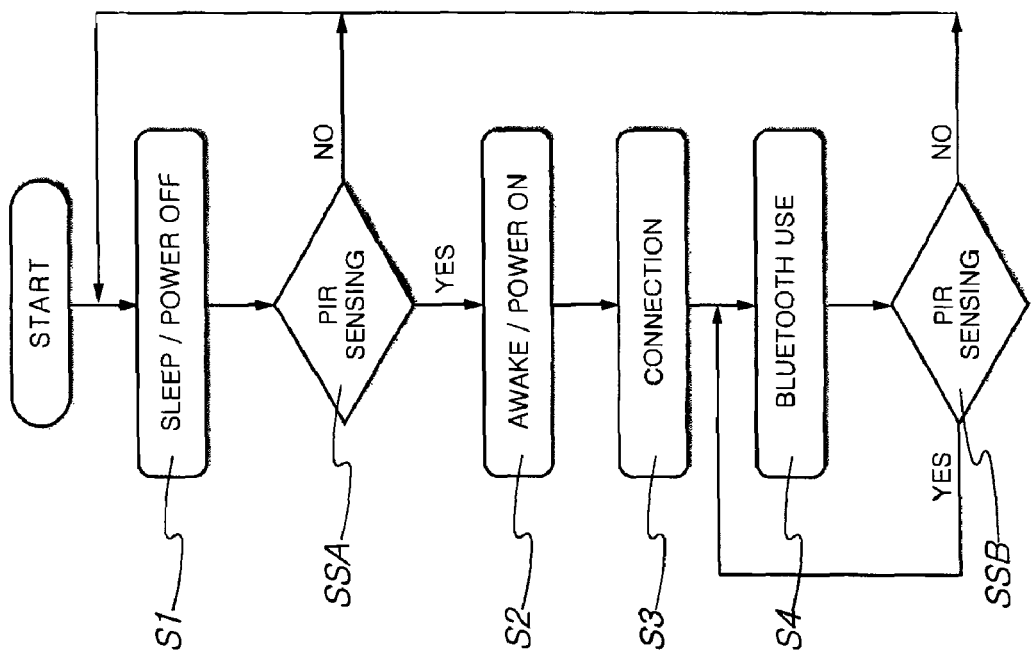
FIG. 3 is a flowchart illustrating an operation of a mounting type Bluetooth unit according to an embodiment of the present invention.
Figure 4A:
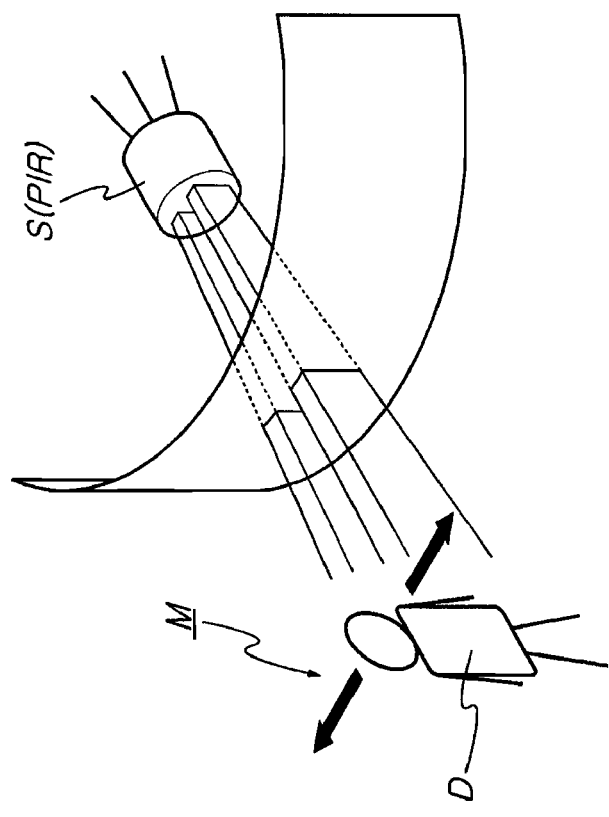
FIG. 4A is a view explaining an operation of a sensor adopted in a mounting type Bluetooth unit according to an embodiment of the present invention.
Figure 4B:
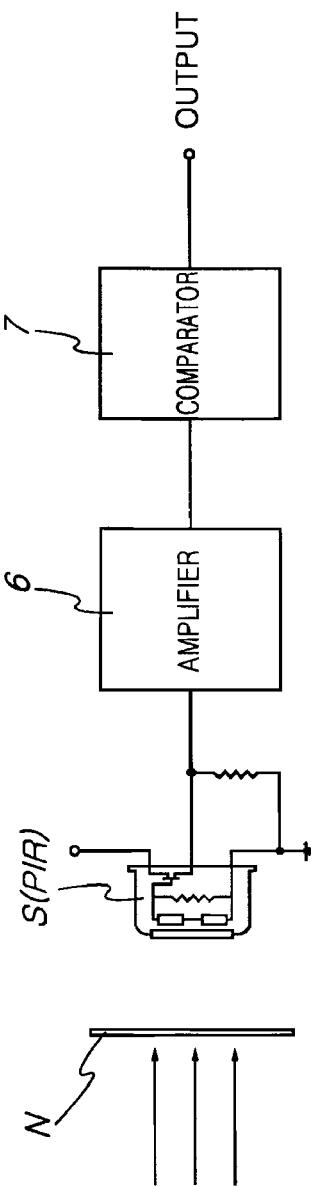
FIG. 4B is a circuit diagram of components of the sensor.
Figure 5:
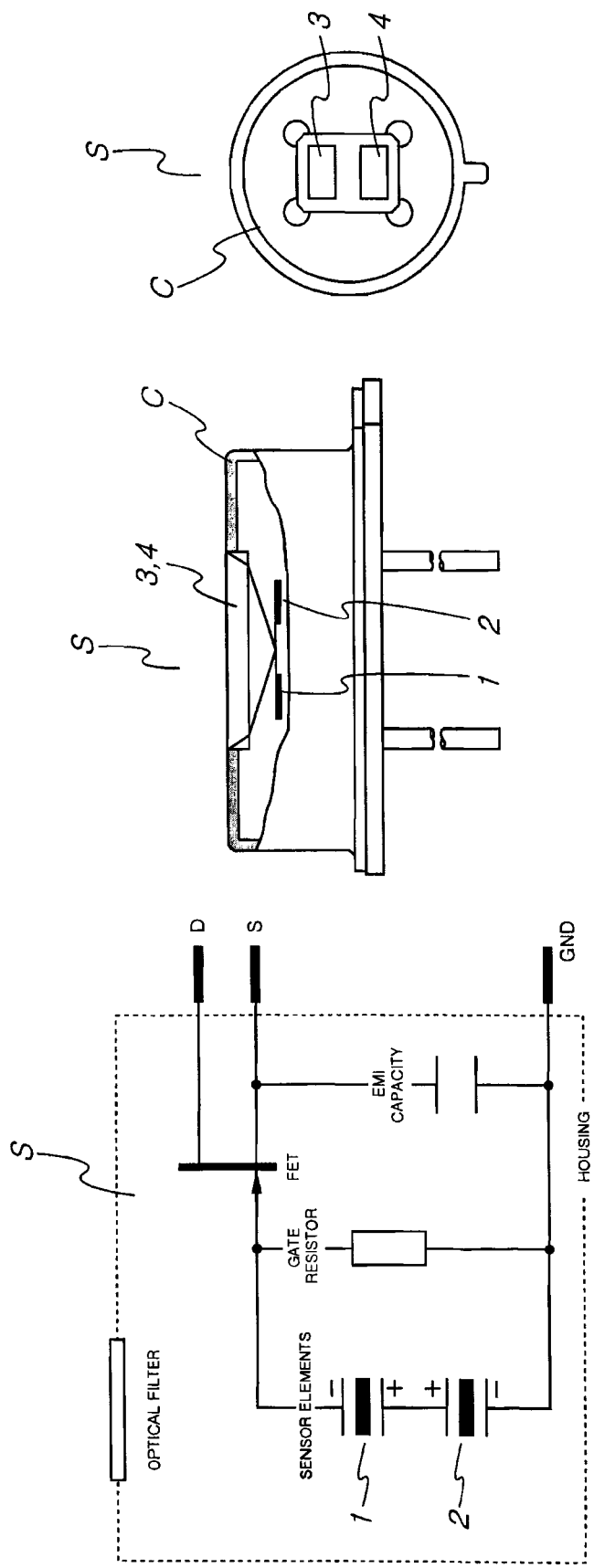
FIG. 5 shows a circuit diagram, a partially cut out schematic side view, and a plan view of a sensor that can be appropriately adopted in a mounting type Bluetooth unit according to an embodiment of the present invention.

FIG. 1 is a view illustrating a use example of a mounting type Bluetooth unit to which the present invention is applied, and FIG. 2 is a circuit diagram illustrating the configuration of a sensor operation unit of a mounting type Bluetooth unit according to an embodiment of the present invention. FIG. 3 is a flowchart illustrating an operation of a mounting type Bluetooth unit according to an embodiment of the present invention. FIG. 4A is a view explaining an operation of a sensor adopted in a mounting type Bluetooth unit according to an embodiment of the present invention, and FIG. 4B is a circuit diagram of components of the sensor. FIG. 5 shows a circuit diagram, a partially cut out schematic side view, and a plan view of a sensor that can be appropriately adopted in a mounting type Bluetooth unit according to an embodiment of the present invention.

As a use example of a mounting type Bluetooth unit U as illustrated in FIG. 1, the Bluetooth unit U, which is mounted to fit on a sun visor SV of a typical vehicle V by a clip C or installed on a window-mounting arm (not illustrated) and so on, has a built-in circuit board, and is typically operated by a rechargable battery (not illustrated) to perform Bluetooth communication with a portable phone M having various kinds of Bluetooth communication functions.

The Bluetooth unit U according to an embodiment of the present invention includes a human body sensor S for sensing a driver's getting into or out of the vehicle with respect to the mounting type Bluetooth unit U, a controller CPU for sensing and controlling the operation state of the human body sensor S, and control logic.

The human body sensor S adopted in the present invention is a sensor for sensing whether a person exists in a predetermined space. Diverse kinds of human body sensors have been commercialized and put on the market, and have been adopted in security systems, entrance door control, various kinds of playthings, and the like.

The human body sensor S adopted in the present invention has the following primary features.

1. The sensing medium of the sensor senses the body heat emitted from the human body to generate a driving trigger.

2. Since a sensing system that senses the driver's getting into/out of the vehicle V simply through the sensing of the body heat may cause a malfunction especially in the summer season in which the sunlight is strong and the indoor temperature of the vehicle V may be heightened over the human body temperature, a sensor that can sense the movement (in all directions) of a moving target simultaneously with sensing of the specified temperature range (i.e. temperature range close to the human body temperature) is required.

In FIGS. 4 and 5, the human body sensor S in the form of dual compensated sensing elements, which has been developed to satisfy the above-described requirements, is illustrated as a PIR (Pyroelectric Infrared Radial) sensor.

The PIR sensor P, as illustrated in FIG. 5, is packaged in a capsule 5, which connects two heat sensing elements 1 and 2 in series and has a plurality of sensing windows 3 and 4, and the sensing signal, as shown in FIGS. 4A and 4B, is output through an amplifier 6 and a comparator 7.

As illustrated in FIG. 5, signals from the two heat sensing elements 1 and 2, which sense both the body temperature and the movement of a driver D, are compared with each other through the comparator 6, and a waveform signal for triggering is output from the comparator 6 as a moving object sensing signal.

The human body sensor S, which is the PIR sensor P of the Bluetooth unit U, is installed on a front panel N of a casing CS toward the driver D, and output lines of the human body sensor S are connected to the controller CPU that is a Bluetooth control chip.

The controller CPU, which is a Bluetooth controller of which the whole configuration is illustrated in FIG. 2, has a battery 10, an antenna 11, a microphone 12, a speaker 13, a USB connector 14, and the like, as its peripheral devices, and is connected to the human body sensor S that provides a drive control signal of a control program to the controller.

Through this hardware configuration, the signal from the human body sensor S is used to control the logic that is operated by the Bluetooth unit U, and the detailed logic that should be basically provided is illustrated in the flowchart of FIG. 3.

As the power is initially applied, the human body sensor S, which is continuously in a sensible state, senses the interior of the vehicle V (step SSA). If the driver D gets out of the vehicle V, the human body sensor S of the Bluetooth unit U senses the body temperature and the non-movement M of the driver D ("No" in step SSA) to provide no output signal. In this case, the Bluetooth unit U is in a sleep state in which the operation thereof is inactivated or in a power-off state (step S1).

If a predetermined time elapses in the sleep state, the Bluetooth unit U may be in the power-off state.

If the driver D gets into the vehicle V, the human body sensor S senses this immediately or after a predetermined time (this delay time is to remove the malfunction due to a low initial body temperature when the driver gets into the vehicle especially in winter seasons. The output signal of the human body sensor S is transferred to the controller CPU, and based on this output signal, the controller CPU awakens the Bluetooth unit U to start its operation or triggers the Bluetooth unit U from the power-off state to the power-on state.

The controller CPU of the Bluetooth unit U attempts to connect with a surrounding Bluetooth device, i.e. a Bluetooth device of a portable phone (step S3), and maintains the connection state with the Bluetooth device of the portable phone (step S4).

If the driver D gets out of the vehicle, the human body sensor S senses this (step SSB). If the driver who is the sensing target is not in the interior of the vehicle and no output is provided from the human body sensor S ("No" in step SSB), the controller CPU cancels the connection with the Bluetooth device of the portable phone, and shifts to the sleep state or the power-off state (step S1).

If the human body sensor senses the driver's getting into the vehicle ("Yes" in step SSB), the Bluetooth connection state is continuously kept (step S4).

In the above-described steps, the entrance into the sleep state or the shifting to the power-off state is not immediately performed, but is performed after a predetermined time elapses. This is to discriminate the human body's instantaneous and minute movement stop.

In an embodiment of the present invention, it is exemplified that the PIR sensor P is used as the human body sensor S. However, it is also possible to use a voice-based power saving control method, for example, to use an audio sensor, which senses the voice of a specified command (e.g. "Start operation", "Good morning", or the like) and cancels the sleep state of the Bluetooth unit U, and to further provide logic for initially memorizing the voice pattern of the driver D.

However, such a configuration that requests a specified operation from a human is not suitable to the fool-proof design concept due to the human forgetfulness.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A mounting type Bluetooth unit fixedly installed in the interior of a vehicle, the mounting type Bluetooth unit comprising:
   a casing body; and
   a circuit board packaged in the casing body, the circuit board having a controller,
   wherein the controller comprises:
   a communication control logic for performing Bluetooth communication with a Bluetooth device of a portable phone;
   a human body sensor functioning as a control switch of an operation logic; and
   an operation control logic for sensing driver's getting into/out of the vehicle in accordance with the existence/nonexistence of a sensing signal of the human body sensor and controlling the operation of the Bluetooth unit into a sleep/awake or power-on/off state to cancel pairing with the Bluetooth device in a non-use state.

2. The mounting type Bluetooth unit according to claim 1, wherein the operation control logic of the controller executes the steps in which:
   the human body sensor that is in a continuous sensing state senses the interior of the vehicle;
   if the driver gets out of the vehicle and the human body sensor of the Bluetooth unit senses no body temperature and non-movement of the driver to provide no output signal, the Bluetooth unit is in a sleep state in which its operation is deactivated or in a power-off state;
   if the driver gets into the vehicle, the human body sensor senses a riding of the driver on the vehicle, an output signal from the human body sensor is transferred to the controller, and the controller awakens the Bluetooth unit to start its operation or triggers the power-on of the Bluetooth unit;
   the controller of the Bluetooth unit attempts a connection with a surrounding Bluetooth device of a portable phone and keeps a use state of the connected Bluetooth device;

if the driver gets out of the vehicle and the human body sensor provides no output signal due to the absence of the driver in the vehicle, the connection with the Bluetooth device of the portable phone is cancelled and the use state is switched to the sleep state or the power-off state; and if the human body sensor senses the driver's getting in the vehicle, the Bluetooth connection state is maintained.

3. The mounting type Bluetooth unit according to claim 2, wherein the controller further comprises a logic that performs an entrance into the sleep state or a shifting to the power-off state after a predetermined time elapses.

4. The mounting type Bluetooth unit according to claim 1, wherein the human body sensor comprises dual compensated sensing elements that sense the body temperature and the movement of the human body.

5. The mounting type Bluetooth unit according to claim 4, wherein the human body sensor is a PIR (Pyroelectric Infrared Radial) sensor.

* * * * *